Sept. 21, 1943.  R. CADWALLADER ET AL  2,329,874
COMBINED BUMPER AND GRILLE
Filed Nov. 21, 1941
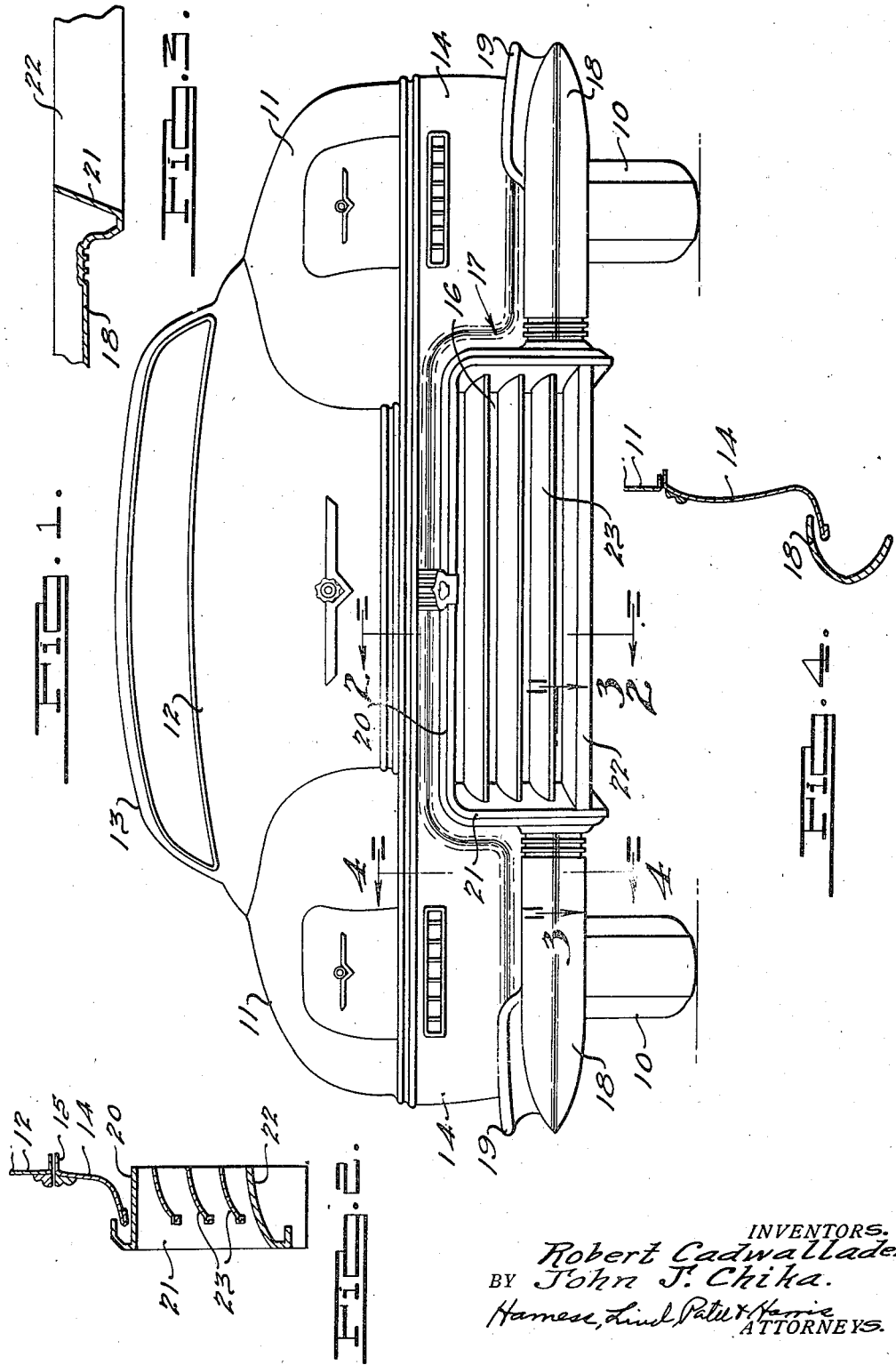
INVENTORS.
Robert Cadwallader,
BY John J. Chika.
Harness, Dickey, Pierce & Harris
ATTORNEYS.

UNITED STATES PATENT OFFICE 2,329,874

COMBINED BUMPER AND GRILLE

Robert Cadwallader, Detroit, and John J. Chika, Berkley, Mich., assignors to Chrysler Corporation, Highland Park, Mich., a corporation of Delaware Application November 21, 1941, Serial No. 419,894

5 Claims. (Cl. 293—55)

This invention relates to automobile bumpers in general and particularly to a combined bumper and radiator grille construction.

Recent styling of automobiles has displayed a tendency toward elimination of the radiator air inlet opening and accompanying decorative grille. If the radiator opening and grille could be entirely done away with, the front end of the car could be given a cleaner appearance and a form nearer to a perfect streamline would be the result.

It has been found, however, that some cooling air and preferably the major portion thereof should be admitted to the radiator and engine compartment by way of the front end of the vehicle if satisfactory cooling is to be had.

We have evolved a novel combined bumper and grille which is adapted to be mounted at the front end of the vehicle (or at the rear end thereof if the engine is in the rear) and which serves as a bumper as well as a protective and decorative grille for the radiator air inlet.

Accordingly, it is the principal object of our invention to provide a combined bumper and radiator grille.

An additional object is to provide in such an article, a construction wherein the grille structure will be protected from injury during use and which shall have a pleasing appearance.

A further object is to provide a unitary bumper and grille structure which is removable from the vehicle as a unit.

Other objects and advantages of our invention will be apparent from the following description. In the drawing:

Fig. 1 is a front elevation of a motor vehicle showing a preferred form of the invention in a typical environment.

Figs. 2, 3 and 4 are sectional views taken as indicated by the corresponding arrows on Fig. 1.

The vehicle illustrated has front wheels 10, front fenders 11 between which is disposed a hood panel 12, and a superstructure 13. The hood panel seats on the upper horizontal flange 15 of a panel 14 which extends across the front end of the vehicle as illustrated in Figs. 1, 2 and 4.

The central portion of the panel 14 is partially cut away to form an air inlet opening 16 through which the engine radiator cooling air is adapted to pass.

Attached to the front of the vehicle by the usual brackets (not shown) is a combined bumper and grille structure which is designated generally by the reference numeral 17.

This bumper and grille structure has end portions 18 of substantially U-shape (Fig. 4) which are adapted to overlie the front marginal edges of the fender panels 14. Ears 19 may be integrally formed on the end portions for additional protection of the fenders.

Between the end portions and adjacent the opening 16, lies a central portion 20 which is parallel to the end portions 18 and connected thereto by leg portions 21. The central portion 20, the legs 21 and the end portions 18 are preferably formed of one piece of heavy gauge bumper stock by stamping or forging, but if preferred, the portions may be separately formed and welded together.

As can be seen from Fig. 1, the central portion of the structure is in the form of an inverted U and between the legs 21 at approximately the level of the lower edge of the end portions, a bar 22 is suitably secured. The bar 22 is preferably of bumper gauge material and the front marginal edges of the portions 18, 20, 21 and 22 are all aligned thus forming a strong and handsome bumper structure. Because of the ears 19 and the raised center portion 20, auxiliary bumper members such as are usually used are not necessary.

While the opening 16, which is framed by the rectangular structure formed by the portions 20, 21 and the bar 22, may be left open, it is preferable from the appearance standpoint to provide a grille structure.

The grille structure is formed of relatively light gauge bars 23 welded or otherwise suitably attached to the inner surfaces of the legs 21. These bars 23 are set rearwardly of the front edge of the bumper structure, as can be seen from Figs. 1 and 2, and are thus protected from injury due to minor collisions, etc.

The bars are spaced apart sufficiently to offer no substantial obstruction to the flow of air and are shaped in cross section such that the radiator core is hidden from view. The entire bumper and grille structure may be plated and polished, or it may be painted, or it may be partly plated and partly painted.

The portions 18 and 20 have rearwardly bent flanges which overlie and hide the marginal edges of the adjacent body panels and the bars 22 and 23 have reversely bent marginal edge portions which give an appearance of ruggedness.

The entire structure is designed to be assembled into a unit for easy attachment to and removal from the vehicle.

Having thus described a preferred form of our invention, we wish it understood that we do not wish to be limited with respect to the broader aspects thereof except as set forth in the following claims.

We claim:

1. A combined bumper and radiator grille for motor vehicles comprising an impact bar adapted to extend across the end of the vehicle, said bar having end portions disposed substantially in the plane of the front marginal edge of the vehicle fenders and a central portion extending between said end portions and connected thereto, said central portion including vertically spaced bars adapted to form an air inlet; and grille bars disposed horizontally in said inlet.

2. A decorative bumper and grille structure for vehicles comprising a horizontally disposed impact bar having end portions of substantially U-shape cross section and a central portion connecting said end portions; said central portion comprising a pair of vertically spaced impact bar portions of substantially flat stock formed with reversely bent edges, the opening between said bar portions being adapted to form an air inlet.

3. A decorative bumper and grille structure for vehicles comprising a horizontally disposed impact bar having end portions of substantially U-shape cross section and a central portion connecting said end portions; said central portion comprising a pair of vertically spaced impact bar portions of substantially flat stock formed with reversely bent edges, the opening between said bar portions being adapted to form an air inlet, and a decorative grille disposed in said inlet.

4. A decorative bumper and grille structure for vehicles comprising a horizontally disposed impact bar having end portions of substantially U-shape cross section and a central portion connecting said end portions; said central portion comprising a pair of vertically spaced impact bar portions of substantially flat stock formed with reversely bent edges, the opening between said bar portions being adapted to form an air inlet, and a plurality of relatively light guage bars disposed in said opening thereby to provide a grille.

5. A decorative bumper and grille structure for vehicles comprising a horizontally disposed impact bar having end portions of substantially U-shape cross section and a central portion connecting said end portions; said central portion comprising a pair of vertically spaced impact bar portions of substantially flat stock formed with reversely bent edges, the opening between said bar portions being adapted to form an air inlet, and a plurality of relatively light gauge bars disposed in said opening, said bars being relatively narrower than said impact portions and disposed inwardly of the outer marginal edges thereof.

ROBERT CADWALLADER.
JOHN J. CHIKA.